US009701181B2

(12) United States Patent
Moelker et al.

(10) Patent No.: US 9,701,181 B2
(45) Date of Patent: Jul. 11, 2017

(54) VEHICLE SUN VISOR HAVING AN EXPOSED POSITIONING ASSEMBLY

(71) Applicant: Motus Integrated Technologies, Holland, MI (US)

(72) Inventors: Nicholas T. Moelker, Allendale, MI (US); Patrick Welter, Lachambre (FR); Frederic Selvini, Falck (FR)

(73) Assignee: Motus Integrated Technologoes, Holland, MI (US)

( * ) Notice: Subject to any disclaimer, the term of this patent is extended or adjusted under 35 U.S.C. 154(b) by 0 days.

(21) Appl. No.: 14/891,713

(22) PCT Filed: May 16, 2014

(86) PCT No.: PCT/US2014/038486
§ 371 (c)(1),
(2) Date: Nov. 17, 2015

(87) PCT Pub. No.: WO2014/186762
PCT Pub. Date: Nov. 20, 2014

(65) Prior Publication Data
US 2016/0114657 A1    Apr. 28, 2016

Related U.S. Application Data

(60) Provisional application No. 61/824,572, filed on May 17, 2013.

(51) Int. Cl.
*B60J 3/02* (2006.01)
(52) U.S. Cl.
CPC .......... *B60J 3/0278* (2013.01); *B60J 3/0265* (2013.01); *B60J 3/0282* (2013.01)

(58) Field of Classification Search
CPC . B60J 3/0208; B60J 3/0204; B60J 3/02; B60J 3/0282; B60J 3/0247; B60J 3/0278; B60J 3/04; B60R 11/00; B60R 2011/0035; B60R 7/05; B60R 11/02; B60R 11/0235; B60R 11/0252; B60R 11/0258
USPC .................. 296/97.1, 97.5, 97.9, 99.1, 95.1; 359/601, 614, 361, 603, 608, 838
See application file for complete search history.

(56) References Cited

U.S. PATENT DOCUMENTS 4,953,064 A * 8/1990 Viertel ..................... B60J 3/023
296/97.5
5,011,211 A * 4/1991 Svensson ............. B60Q 3/0226
296/97.1
(Continued)

FOREIGN PATENT DOCUMENTS

DE    10020106    5/2001
WO    0053445    9/2000

OTHER PUBLICATIONS

PCT International Search Report and Written Opinion dated Jul. 9, 2014.

*Primary Examiner* — Glenn Dayoan
*Assistant Examiner* — Sunsurraye Westbrook
(74) *Attorney, Agent, or Firm* — Fletcher Yoder, P.C.

(57) ABSTRACT

A vehicle sun visor includes a positioning assembly configured to facilitate rotation and/or translation of the vehicle sun visor relative to an interior of a vehicle. The positioning assembly includes a casing configured to house a positioning mechanism, and an outer surface of the casing forms at least a portion of a show surface of the vehicle sun visor.

19 Claims, 5 Drawing Sheets

(56) References Cited

U.S. PATENT DOCUMENTS

| | | | | |
|---|---|---|---|---|
| 5,653,490 | A * | 8/1997 | Fink | B60J 3/0239 296/97.11 |
| 6,220,644 | B1 * | 4/2001 | Tiesler | B60J 3/0239 296/97.11 |
| 6,302,467 | B1 * | 10/2001 | Crotty, III | B60J 3/0278 296/97.1 |
| 6,325,527 | B1 * | 12/2001 | Lee | B60J 3/0282 362/137 |
| 6,637,799 | B1 | 10/2003 | Tiesler | |
| 6,957,841 | B1 * | 10/2005 | Tiesler | B60J 3/0278 296/97.12 |
| 7,032,949 | B1 * | 4/2006 | Wang | B60J 3/0278 296/97.5 |

\* cited by examiner

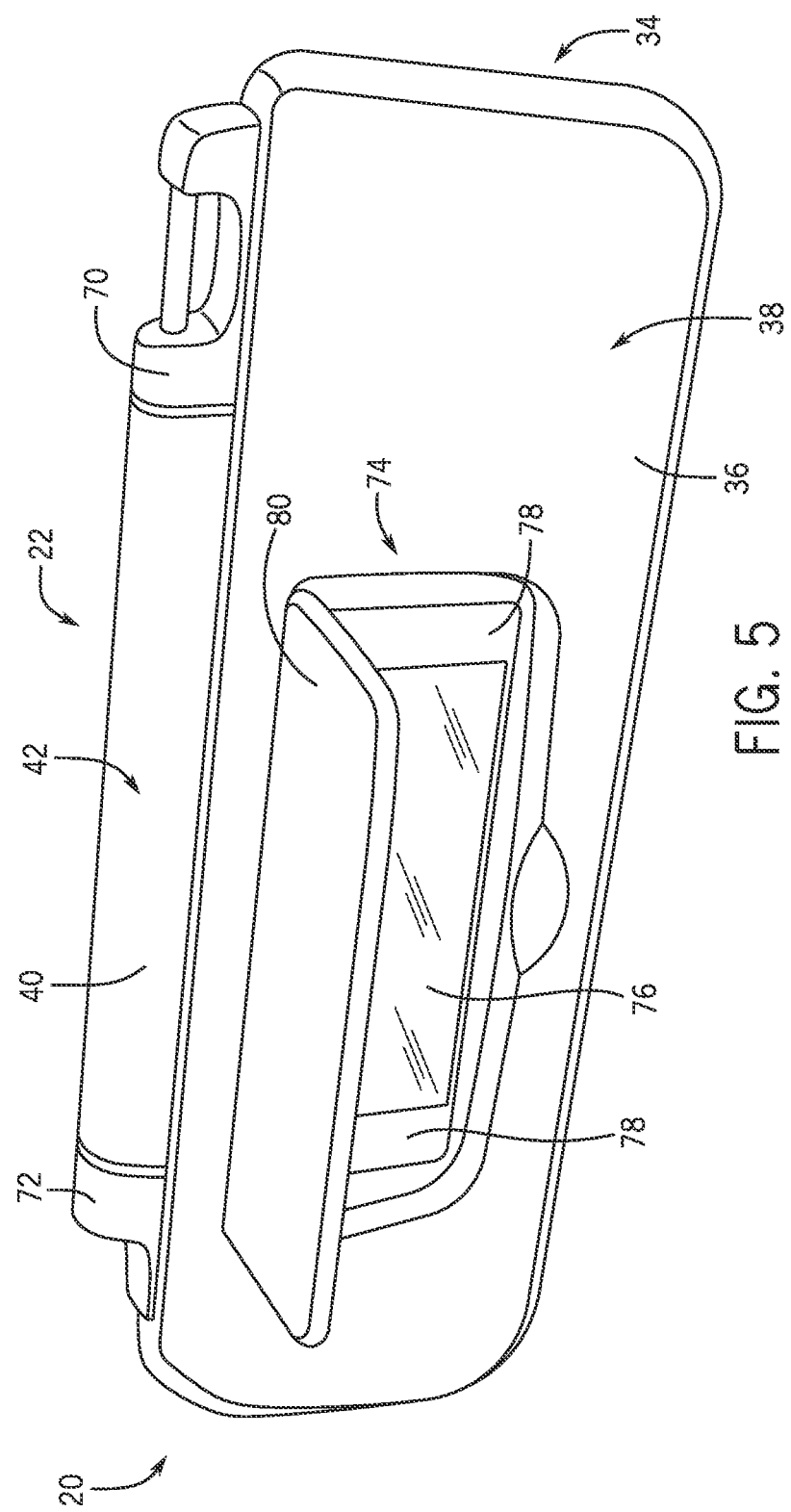

VEHICLE SUN VISOR HAVING AN EXPOSED POSITIONING ASSEMBLY

CROSS REFERENCE TO RELATED APPLICATION

This application is a national stage of PCT Application No. PCT/US2014/038486, entitled "VEHICLE SUN VISOR HAVING AN EXPOSED POSITIONING ASSEMBLY", filed on May 16, 2014, which claims priority from and the benefit of U.S. Provisional Patent Application Ser. No. 61/824,572, entitled "VEHICLE SUN VISOR HAVING AN EXPOSED POSITIONING ASSEMBLY", filed May 17, 2013. Each of the foregoing applications is hereby incorporated by reference in its entirety.

BACKGROUND

The invention relates generally to a vehicle sun visor having an exposed positioning assembly.

Many vehicles employ sun visors to shield occupants from sunlight, thereby enabling the occupants to focus on the surrounding environment. For example, certain vehicles include sun visors positioned adjacent to a top portion of the windshield to facilitate access by a driver and/or front passenger. Under certain lighting conditions, a driver may deploy the sun visor to reduce light transmission into the vehicle interior, thereby enabling the driver to focus on vehicle operations. Certain sun visors include a positioning assembly configured to enable the sun visor to rotate from a stored position to a deployed position, and to enable the sun visor to slide from a retracted position to an extended position. Unfortunately, the positioning assembly may increase a thickness of the sun visor, thereby reducing occupant headroom and/or increasing a height of the vehicle roofline.

BRIEF DESCRIPTION OF THE INVENTION

The present invention relates to a vehicle sun visor including a positioning assembly configured to facilitate rotation and/or translation of the vehicle sun visor relative to an interior of a vehicle. The positioning assembly includes a casing configured to house a positioning mechanism, and an outer surface of the casing forms at least a portion of a show surface of the vehicle sun visor.

The present invention also relates to a vehicle sun visor including a structural core and a covering at least partially disposed about the structural core. The covering forms a first portion of a show surface of the vehicle sun visor. The vehicle sun visor also includes a positioning assembly coupled to the structural core. The positioning assembly is configured to facilitate rotation and/or translation of the vehicle sun visor relative to an interior of a vehicle, the positioning assembly includes a casing configured to house a positioning mechanism, and an outer surface of the casing forms a second portion of the show surface of the vehicle sun visor.

The present invention further relates to a vehicle sun visor including a body and a positioning assembly coupled to the body. The positioning assembly is configured to facilitate rotation and/or translation of the vehicle sun visor relative to an interior of a vehicle. In addition, the positioning assembly includes a casing and end caps disposed on opposite longitudinal ends of the casing, the casing is configured to house a positioning mechanism, and an outer surface of the casing forms a portion of a show surface of the vehicle sun visor.

DRAWINGS

FIG. 5 is a perspective view of another embodiment of a sun visor having an exposed positioning assembly.

DETAILED DESCRIPTION

Figure 1:
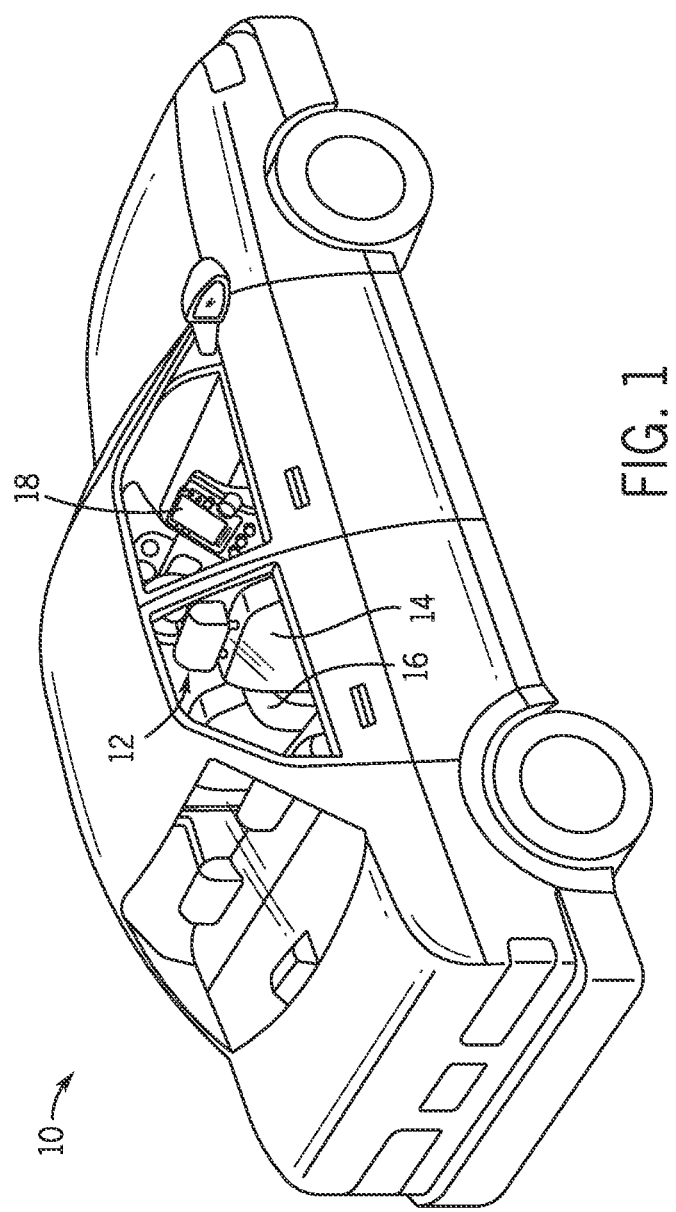
FIG. 1 is a perspective view of an exemplary vehicle that may include at least one sun visor having an exposed positioning assembly.

FIG. 1 is a perspective view of a motor vehicle 10 including at least one sun visor having an exposed positioning assembly. As illustrated, the vehicle 10 includes an interior 12 having a seat 14, an armrest 16, and a center console 18. In certain embodiments, the vehicle 10 may include sun visors configured to shield vehicle occupants from sunlight. In such embodiments, each sun visor includes a positioning assembly configured to facilitate rotation and/or translation of the sun visor relative to the interior 12 of the vehicle 10. The positioning assembly includes a casing configured to house a positioning mechanism, and an outer surface of the casing forms at least a portion of a show surface of the vehicle sun visor. The exposed casing enables the sun visor to be thinner than sun visors having a covering disposed about the positioning assembly. As a result, headroom within the vehicle interior 12 may be increased, thereby enhancing passenger comfort. In addition, a thinner sun visor may facilitate construction of a vehicle having a lower roofline, thereby increasing fuel efficiency of the vehicle.

Figure 2:
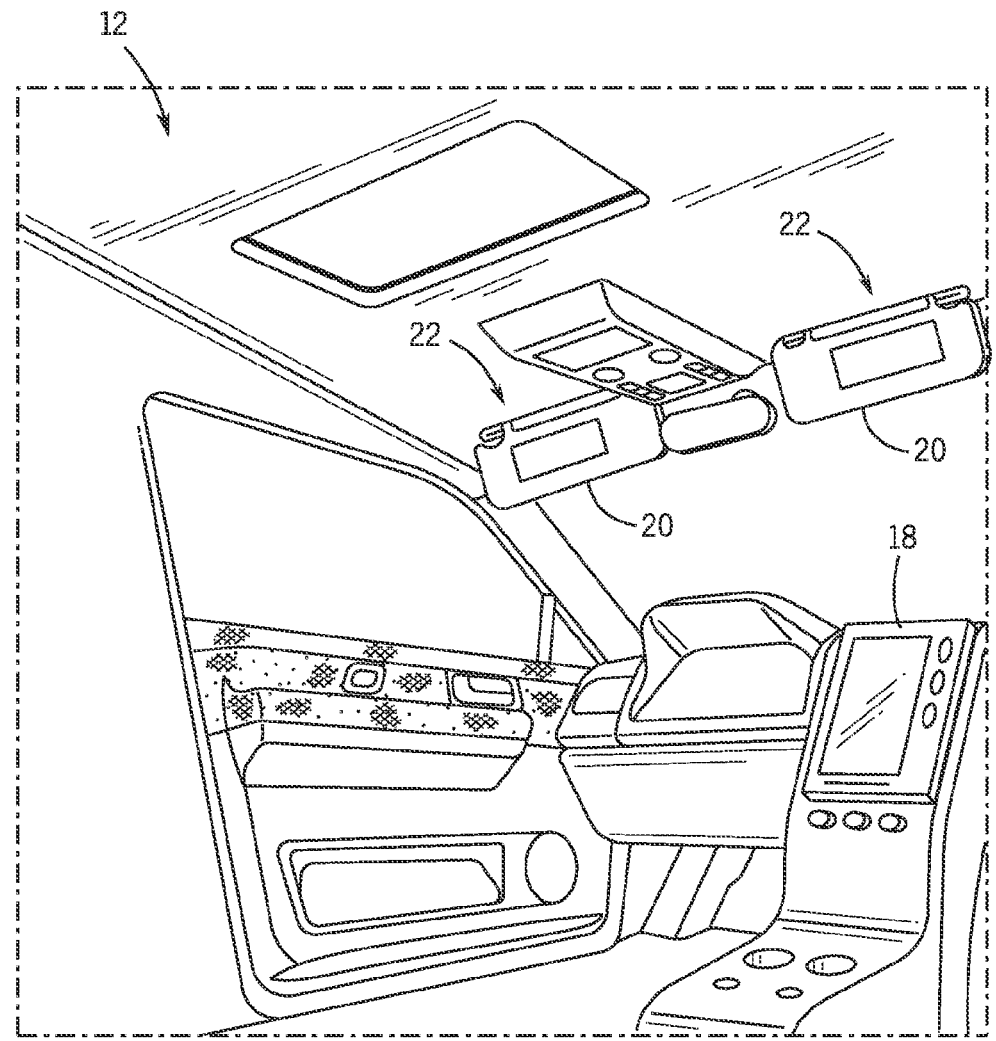
FIG. 2 is a perspective view of a part of the interior of the vehicle of FIG. 1.

FIG. 2 is a perspective view of a part of the interior 12 of the vehicle 10 of FIG. 1. As illustrated, the vehicle interior 12 includes a sun visor 20 having an exposed positioning assembly 22. As discussed in detail below, the positioning assembly 22 is configured to facilitate rotation and/or translation of the sun visor 20 relative to the interior 12 of the vehicle 10. In addition, the sun visor 20 may include a structural core and a covering at least partially disposed about the structural core. The covering is configured to form a first portion of a show surface of the sun visor 20. Furthermore, the positioning assembly includes a casing configured to house a positioning mechanism, and an outer surface of the casing forms a second portion of the show surface of the sun visor 20. As previously discussed, the exposed casing facilitates a reduction in the width of the sun visor, thereby increasing headroom and/or facilitating construction of a vehicle having a lower roofline. In certain embodiments, a decorative layer may be disposed onto the outer surface of the casing, thereby enhancing the appearance of the sun visor 20.

As used herein, "show surface" refers to an outer surface of the outermost structural component (e.g., the positioning assembly casing, the covering at least partially disposed about the structural core, etc.) of the sun visor 20. For example, the outer surface of the positioning assembly casing forms a portion of the show surface because the outer surface faces the interior 12 of the vehicle 10 and is not covered by another structural component (e.g., the covering at least partially disposed about the structural core). As discussed in detail below, the show surface of the sun visor 20 may be visible to a vehicle occupant or may be covered by a decorative/functional layer to enhance the appearance/operation of the sun visor 20. For example, the outer surface of the casing, which forms a portion of the show surface of the sun visor, may be coated with a hydrographic printed layer, an anodized layer, or a rubberized coating, among other decorative/functional layers.

Figure 3:
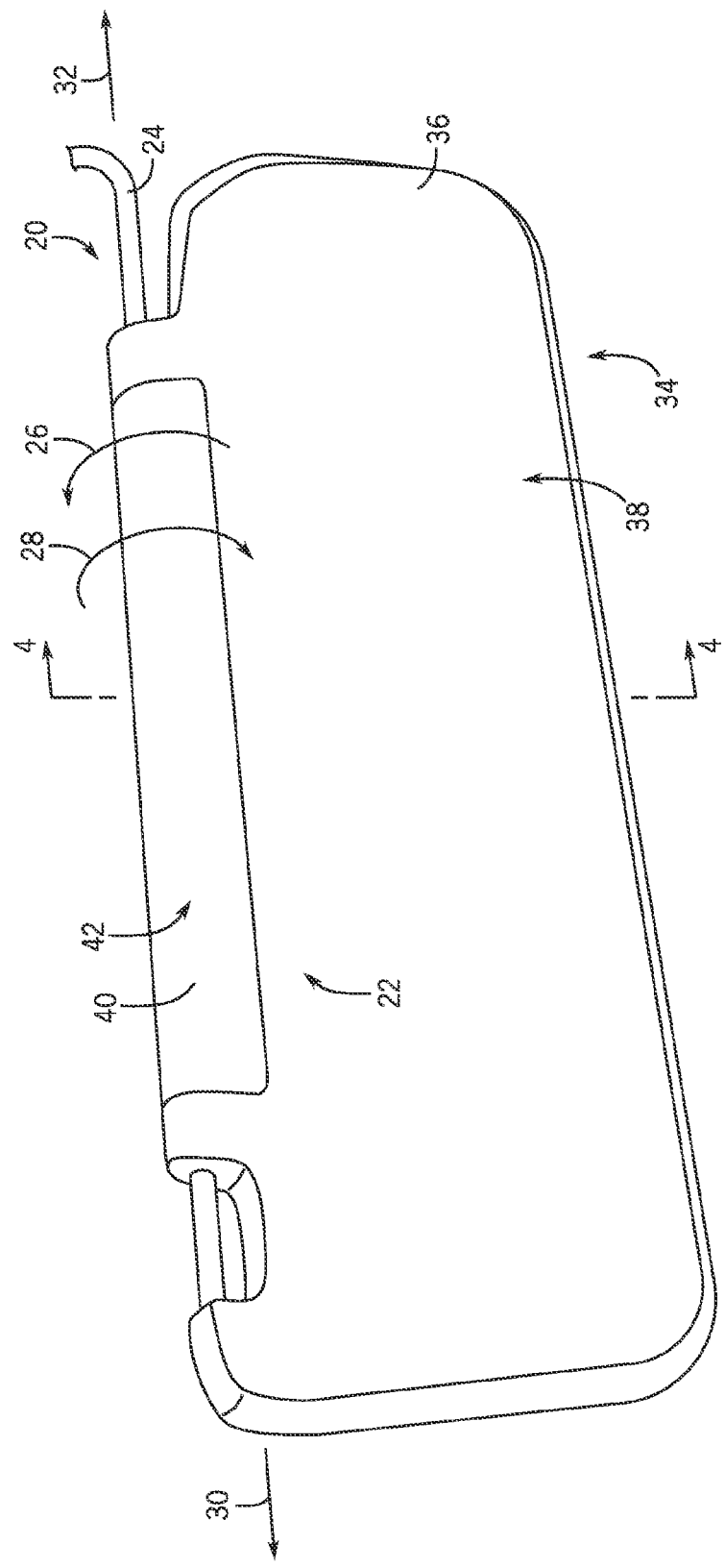
FIG. 3 is a perspective view of an embodiment of a sun visor having an exposed positioning assembly.

FIG. 3 is a perspective view of an embodiment of a sun visor 20 having an exposed positioning assembly 22. The positioning assembly 22 is configured to facilitate rotation and/or translation of the sun visor 20 relative to the interior of the vehicle. In the illustrated embodiment, the sun visor 20 is supported within the vehicle interior by an elbow tube 24. The positioning assembly 22 is configured to enable the sun visor 20 to rotate about the elbow tube 24 and to translate along the elbow tube 24. For example, the positioning assembly 22 is configured to facilitate rotation of the sun visor from the illustrated deployed position to a stored position (e.g., proximate to a headliner of the vehicle interior) in a direction 26. The positioning assembly 22 is also configured to enable the sun visor to transition from the stored position to the deployed position via rotation about the elbow tube 24 in the direction 28. Furthermore, the positioning assembly 22 is configured to enable the sun visor 20 to translate along the elbow tube 24 in an outwardly direction 30 and in an inwardly direction 32. As a result, the sun visor 20 may be positioned to shield an occupant from sunlight during operation of the vehicle.

In the illustrated embodiment, the sun visor 20 includes a body 34 having a structural core and a covering 36 at least partially disposed about the structural core. As illustrated, the covering 36 forms a portion of a show surface 38 of the sun visor 20. The covering 36 may be formed from any suitable material, such as a woven or non-woven polymeric material (e.g., vinyl, polyamide, etc.), a fabric, leather, or other material configured to provide a desirable show surface 38. In certain embodiments, a color and/or texture of the covering 36 may be particularly selected to match and/or compliment the design of the vehicle interior 12.

As illustrated, the positioning assembly 22 is coupled to the body 34. The positioning assembly 22 includes a casing 40 configured to house a positioning mechanism. In addition, an outer surface 42 of the casing 40 is configured to form a portion of the show surface 38 of the sun visor 20. As discussed in detail below, a decorative layer may be disposed onto the outer surface 42 of the casing 40 to enhance the appearance of the sun visor 20. For example, in certain embodiments, the casing is formed from extruded aluminum, and the outer surface 42 of the casing is anodized to provide a desired appearance. In further embodiments, a decorative layer may be printed onto the outer surface 42 of the casing 40 by a hydrographic printing process. Similar to the covering 36, the color and/or texture of the decorative layer may be particularly selected to match and/or compliment the design of the vehicle interior 12.

Figure 4:
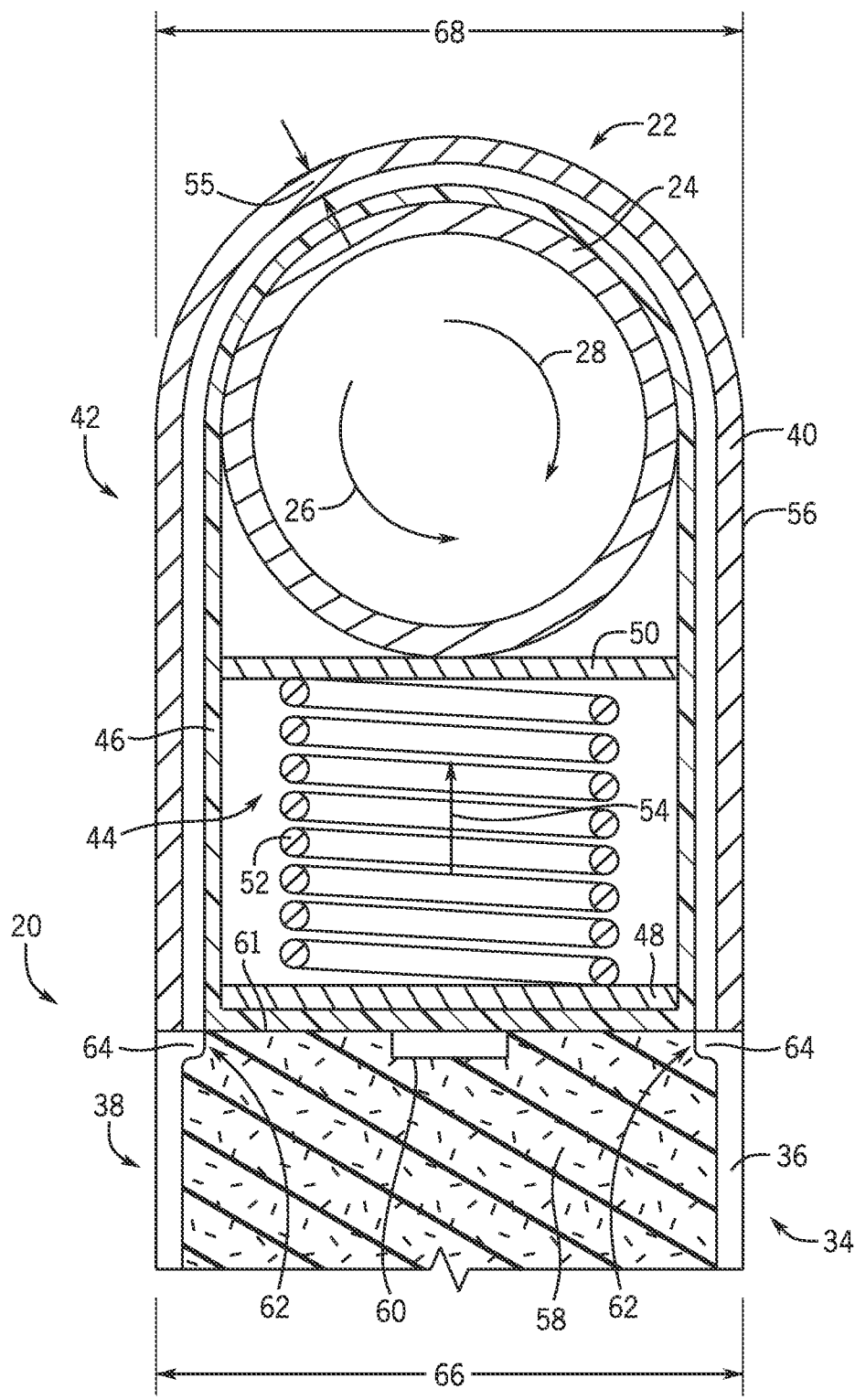
FIG. 4 is a cross-sectional view of the sun visor of FIG. 3, taken along line 4-4.

FIG. 4 is a cross-sectional view of the sun visor 20 of FIG. 3, taken along line 4-4. As previously discussed, the positioning assembly 22 includes a casing 40 configured to house a positioning mechanism 44. The positioning mechanism 44 is configured to facilitate rotation and/or translation of the sun visor 20 relative to the vehicle interior 12. As illustrated, the positioning mechanism 44 includes a carrier 46, a spring plate 48, a friction plate 50, and a coil spring 52. The carrier 46 forms an enclosure about the elbow tube 24, and the spring plate 48 is positioned against a wall of the enclosure proximate to the sun visor body 34. The coil spring 52 extends between the spring plate 48 and the friction plate 50. Accordingly, the coil spring 52 urges the friction plate 50 toward the elbow tube 24 in the direction 54. Contact between the friction plate 50 and the elbow tube 24 establishes a friction force that provides resistance to rotation in the directions 26 and 28. In certain embodiments, the elbow tube 24 may include one or more flat surfaces to establish detents configured to increase rotational resistance while the sun visor is orient in certain positions (e.g., the stored position and/or a fully deployed position). Furthermore, the friction force provides resistance to translation of the sun visor 20 along the elbow tube 24 in the directions 30 and 32.

While the illustrated positioning mechanism 44 includes a coil spring 52, it should be appreciated that other biasing members (e.g., leaf springs, torsion spring, etc.) may be utilized in alternative embodiments. Furthermore, while the illustrated positioning mechanism 44 is configured to facilitate rotation and translation of the sun visor 20 relative to the vehicle interior 12, it should be appreciated that, in alternative embodiments, the positioning mechanism may only enable rotation or only enable translation of the sun visor. In addition, it should be appreciated that other suitable positioning mechanisms may be employed in alternative embodiments.

As previously discussed, the outer surface 42 of the casing 40 forms a portion of the show surface 38 of the sun visor 20. The casing 40 may be formed from any suitable material, such as aluminum, steel, or a polymeric material. In certain embodiments, the casing 40 is formed from extruded aluminum. Alternatively, the casing may be formed from roll-formed steel, injection molded plastic, or other suitable materials. As will be appreciated, a thickness 55 of the casing 40 may be particularly selected to establish a desired strength. For example, if the casing 40 is formed from extruded aluminum, the thickness 55 may be about 0.5 mm to about 2 mm, about 1 mm to about 1.5 mm, or about 1.2 mm. Alternatively, if the casing 40 is formed from roll-formed steel, the thickness 55 of the casing 40 may be about 0.1 mm to about 1 mm, about 0.2 mm to about 0.5 mm, or about 0.3 mm. As discussed in detail below, a thickness of the sun visor 20 may be at least partially dependent on the thickness 55 of the casing 40.

In the illustrated embodiment, a decorative and/or functional layer 56 is disposed onto the outer surface 42 of the casing 40. For example, the layer 56 may be decorative and configured to establish a desired color and/or texture on the outer surface 42, thereby enhancing the appearance of the sun visor 20. In certain embodiments, the decorative layer 56 is applied to the outer surface 42 of the casing 40 by a hydrographic printing process. In such embodiments, a desired pattern is printed on a sheet of water-soluble film. The sheet is then placed on the surface of water within a hydrographic printing tank. Next, a solvent is sprayed onto the sheet, thereby dissolving the film and leaving the pattern floating on the surface of the water. As the casing 40 is dipped into the tank, surface pressure of the water transfers the decorative layer 56 onto the outer surface 42 of the casing 40. Once the decorative layer 56 dries, the pattern becomes permanently affixed to the outer surface 42.

In further embodiments, the decorative layer 56 may be applied by other printing processes, such as flexography, dye-sublimation printing, screen printing, and digital printing, among others. For example, if the decorative layer 56 is applied by a screen printing process, a screen is placed in contact with the outer surface 42 of the casing 40. The screen includes a stencil configured to block ink flow to desired regions of the outer surface 42. Consequently, when ink is applied to the screen (e.g., via a roller or squeegee), a decorative layer 56 is formed having a pattern corresponding to portions of the screen not covered by the stencil. Furthermore, if the decorative layer 56 is applied by a digital printing process (e.g., inkjet printing, etc.), a printing device applies a decorative layer 56 onto the outer surface 42 having a pattern corresponding to a digital image of the desired pattern.

If the casing 40 is formed from aluminum (e.g., extruded aluminum), the outer surface 42 of the casing 40 may be anodized, thereby forming the decorative layer 56. Anodizing involves disposing the casing 40 in an electrolytic solution, and electrolytically forming an oxide coating onto the outer surface 42 of the casing. Dyes may be mixed with the electrolytic solution to establish a desired color of the outer surface 42. The color may be selected to match and/or compliment the color of the covering 36 and/or other components within the vehicle interior. In further embodiments, the outer surface 42 may be electroplated with a desired material (e.g., gold, silver, copper, nickel, chromium, etc.) to establish a desired decorative layer 56. In addition, it should be appreciated that other techniques for applying a decorative layer (e.g., applying a clear coat, applying an applique, applying paint, applying powder coating, utilizing an in-mold decoration for an injection molded casing, etc.) may be utilized in alternative embodiments.

In further embodiments, the layer 56 may be functional and configured to enhance the operation of the sun visor 20 and/or the texture of the casing 40. For example, the functional layer 56 may include a coating configured to enhance the grip/friction coefficient of the casing 40. For example, a rubberized coating and/or a textured coating may be applied to the outer surface 42 to increase friction between an occupant hand and the casing 40 (e.g., during adjustment of the sun visor 20). In further embodiments, the functional layer 56 may include a coating (e.g., an oleophobic coating) configured to reduce formation of fingerprints on the outer surface 42, thereby enhancing the appearance of the sun visor 20. In addition, the functional layer 56 may include a thermally insulating layer and/or a heat dissipating layer configured to reduce the temperature of the outer surface 42 (e.g., during warm and/or sunny conditions), thereby increasing comfort associated with contacting the outer surface 42. It should be appreciated that the functional layer may be applied alone or in combination with the decorative layer (e.g., the decorative layer may be applied over the functional layer). In addition, it should be appreciated that a single layer may include both functional and decorative properties. For example, a color of a rubberized coating may be selected to enhance the aesthetic appearance of the sun visor 20. Furthermore, it should be appreciated that, in certain embodiments, the decorative and/or functional layer may be omitted.

In addition, it should be appreciated that the outer surface 42 of the casing may be textured to enhance the grip/friction coefficient of the casing 40. For example, in certain embodiments, the outer surface may be knurled (e.g., via a milling process) to increase friction between an occupant hand and the casing 40 (e.g., during adjustment of the sun visor 20). In further embodiments, troughs may be scored into the outer surface 42 during extrusion of the casing (e.g., in embodiments in which the casing 40 is formed from extruded aluminum).

As previously discussed, the body 34 of the sun visor 20 includes a structural core 58 and a covering 36 disposed about a portion of the structural core 58. The covering 36 is configured to establish a desirable visual appearance of the sun visor 20. In the illustrated embodiment, the positioning assembly 22 is coupled to the structural core 58 to establishing a unitary sun visor assembly. For example, in the illustrated embodiment, the sun visor 20 includes one or more mechanical fasteners 60 configured to couple the positioning assembly 22 to the structural core 58. The mechanical fasteners may include snaps, screws, bolts, rods, or other fasteners configured to establish a mechanical connection between the positioning assembly 22 and the structural core 58. In addition, the sun visor 20 includes an adhesive layer 61 disposed between the positioning assembly 22 and the structural core 58 to increase a strength of the connection between the components. While the illustrated embodiment includes mechanical fasteners 60 and an adhesive layer 61, it should be appreciated that alternative embodiments may include only mechanical fasteners 60 or only an adhesive layer 61. Moreover, it should be appreciated that other securing devices may be employed in alternative embodiments to couple the positioning assembly 22 to the structural core 58. In certain embodiments, the sun visor 20 may include stiffening elements (e.g., ribs extending from the positioning assembly into the structural core) to reduce bending at the interface between the positioning assembly 22 and the body 34.

In the illustrated embodiment, the structural core 58 includes recesses 62 positioned proximate to the positioning assembly 22. The recesses 62 are configured to receive ends 64 of the covering 36. The ends 64 of the covering 36 are secured within the respective recesses 62 (e.g., via an adhesive connection), thereby securing the covering 36 to the structural core 58. Because the ends 64 of the covering 36 are disposed within the recesses 62, a smooth transition between the covering 36 and the outer surface 42 of the casing 40 is established. In addition, the covering 36 is substantially flush with the outer surface 42 of the casing 40, thereby enhancing the appearance of the sun visor 20.

Because the covering 36 does not extend around the casing 40, a width 66 of the sun visor 20 may be reduced. For example, in the illustrated embodiment, the width 66 of the sun visor 20 is substantially equal to a width 68 of the positioning assembly 22. Accordingly, omitting the covering around the casing reduces the width of the positioning assembly, thereby reducing the width of the sun visor. As previously discussed, the width 68 of the positioning assembly 22 is at least partially dependent on the thickness 55 of the casing 40. Accordingly, reducing the thickness 55 may establish a thinner positioning assembly, thereby reducing the width 66 of the sun visor 20. For example, if the thickness 55 of the casing 40 is about 1.2 mm, the width 68 of the positioning assembly 22 may be about 17 mm. However, if the thickness of the casing 40 is about 0.7 mm, the width 68 of the positioning assembly 22 may be reduced to about 16 mm, thereby facilitating construction of a thinner sun visor. In certain embodiments, the exposed positioning assembly may enable the width 66 of the sun visor 20 to be less than about 20 mm, less than about 19 mm, less than about 18 mm, less than about 17 mm, less than about 16 mm, or less than about 15 mm. By way of example, the width 66 may be about 10 mm to about 20 mm, about 12 mm to about 19 mm, about 14 mm to about 18 mm, or about 17 mm. As previously discussed, reducing the width of the sun visor may provide additional headroom within the vehicle interior. In addition, a thinner sun visor may facilitate construction of a vehicle having a lower roofline, thereby increasing fuel efficiency of the vehicle.

FIG. 5 is a perspective view of another embodiment of a sun visor 20 having an exposed positioning assembly 22. In the illustrated embodiment, the positioning assembly 22 includes end caps 70 and 72 disposed on opposite longitudinal ends of the casing 40. The end caps 70 and 72 are configured to secure the positioning mechanism 44 within the casing 40. In certain embodiments, the end caps 70 and 72 are formed from a polymeric material, such as polypropylene, polyurethane, or polycarbonate, among other materials. The end caps 70 and 72 enable the positioning assembly 22 to be formed as a separate unit from the sun visor body 34. For example, in certain embodiments, the positioning mechanism 44 may be disposed within the casing 40, and then the end caps 70 and 72 may be coupled to respective longitudinal ends of the casing to secure the positioning mechanism within the casing. The complete positioning assembly 22 may then be secured to the body 34 of the sun visor 20 (e.g., via fasteners). This process may reduce the duration of the manufacturing process, as compared to assembling the sun visor body around the positioning assembly 22.

In the illustrated embodiment, the sun visor 20 includes a mirror assembly 74. As illustrated, the mirror assembly 74 includes a mirror 76, lights 78 positioned on opposite longitudinal ends of the mirror 76, and a door 80. The door 80 is configured to rotate between a lowered position that substantially blocks the mirror 76 and a raised position that enables an occupant to view the mirror 76. In certain embodiments, transitioning the door 80 to the raised position automatically activates the lights 78 and transitioning the door 80 to the lowered position automatically deactivates the lights 78. In certain embodiments, a color and/or texture of the door 80 may be selected to match and/or compliment the color and/or texture of the positioning assembly 22, thereby enhancing the appearance of the sun visor 20. While the illustrated embodiment includes a mirror assembly 74, it should be appreciated that the mirror assembly may be omitted in alternative embodiments. In addition, it should be appreciated that the sun visor described above with reference to FIGS. 3 and 4 may include a mirror assembly (e.g., the mirror assembly 74).

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle sun visor, comprising:
a positioning assembly configured to facilitate rotation and translation of the vehicle sun visor relative to an interior of a vehicle, wherein the positioning assembly comprises a casing configured to house a positioning mechanism, the positioning mechanism is configured to facilitate rotation of the vehicle sun visor about a longitudinal axis of an elbow tube and to facilitate translation of the vehicle sun visor along the longitudinal axis of the elbow tube, and an outer surface of the casing forms a portion of a show surface of the vehicle sun visor;
wherein the casing is formed from extruded aluminum or roll-formed steel.

2. The vehicle sun visor of claim 1, comprising a decorative layer, a functional layer, or a combination thereof, disposed onto the outer surface of the casing.

3. The vehicle sun visor of claim 1, wherein the outer surface of the casing is anodized if the casing is formed from extruded aluminum.

4. The vehicle sun visor of claim 1, wherein the outer surface of the casing is substantially flush with a covering of the vehicle sun visor.

5. The vehicle sun visor of claim 1, wherein a first width of the vehicle sun visor is substantially equal to a second width of the positioning assembly.

6. A vehicle sun visor, comprising:
a structural core;
a covering at least partially disposed about the structural core, wherein the covering forms a first portion of a show surface of the vehicle sun visor; and
a positioning assembly coupled to the structural core, wherein the positioning assembly is configured to facilitate rotation and translation of the vehicle sun visor relative to an interior of a vehicle, the positioning assembly comprises a casing configured to house a positioning mechanism, the positioning mechanism is configured to facilitate rotation of the vehicle sun visor about a longitudinal axis of an elbow tube and to facilitate translation of the vehicle sun visor along the longitudinal axis of the elbow tube, and an outer surface of the casing forms a second portion of the show surface of the vehicle sun visor.

7. The vehicle sun visor of claim 6, comprising a mechanical fastener configured to couple the positioning assembly to the structural core, or an adhesive layer configured to couple the positioning assembly to the structural core.

8. The vehicle sun visor of claim 6, wherein the covering is substantially flush with the outer surface of the casing.

9. The vehicle sun visor of claim 6, wherein the structural core comprises a recess positioned proximate to the positioning assembly, and an end of the covering is secured within the recess.

10. The vehicle sun visor of claim 6, comprising a decorative layer, a functional layer, or a combination thereof, disposed onto the outer surface of the casing.

11. The vehicle sun visor of claim 6, wherein the casing is formed from extruded aluminum or roll-formed steel.

12. The vehicle sun visor of claim 6, wherein the positioning mechanism comprises a carrier configured to slide along the elbow tube to facilitate translation of the vehicle sun visor.

13. A vehicle sun visor, comprising:

a positioning assembly configured to facilitate rotation and translation of the vehicle sun visor relative to an interior of a vehicle, wherein the positioning assembly comprises a casing configured to house a positioning mechanism, the positioning mechanism is configured to facilitate rotation of the vehicle sun visor about a longitudinal axis of an elbow tube and to facilitate translation of the vehicle sun visor along the longitudinal axis of the elbow tube, and an outer surface of the casing forms a portion of a show surface of the vehicle sun visor.

14. The vehicle sun visor of claim 13, comprising a body coupled to the positioning assembly, wherein the body comprises a structural core and a covering at least partially disposed about the structural core, wherein the covering forms a second portion of the show surface of the vehicle sun visor.

15. The vehicle sun visor of claim 14, wherein the covering is substantially flush with the outer surface of the casing.

16. The vehicle sun visor of claim 13, comprising a decorative layer, a functional layer, or a combination thereof, disposed onto the outer surface of the casing.

17. The vehicle sun visor of claim 13, wherein the positioning assembly comprises end caps disposed on opposite longitudinal ends of the casing.

18. The vehicle sun visor of claim 17, wherein the end caps are formed from a polymeric material.

19. The vehicle sun visor of claim 13, wherein the positioning mechanism comprises a carrier configured to slide along the elbow tube to facilitate translation of the vehicle sun visor.

* * * * *